(12) United States Patent
Chadwell

(10) Patent No.: US 11,180,258 B2
(45) Date of Patent: Nov. 23, 2021

(54) PAYLOAD ATTACHMENT FITTING AND METHODS TO USE THE SAME

(71) Applicant: Harper Engineering Co., Renton, WA (US)

(72) Inventor: David Chadwell, Renton, WA (US)

(73) Assignee: HARPER ENGINEERING CO., Renton, WA (US)

( * ) Notice: Subject to any disclaimer, the term of this patent is extended or adjusted under 35 U.S.C. 154(b) by 4 days.

(21) Appl. No.: 16/364,820

(22) Filed: Mar. 26, 2019

(65) Prior Publication Data

US 2019/0300178 A1 Oct. 3, 2019

Related U.S. Application Data

(60) Provisional application No. 62/650,798, filed on Mar. 30, 2018.

(51) Int. Cl.
*B64D 11/06* (2006.01)
*B60N 2/015* (2006.01)

(52) U.S. Cl.
CPC ...... *B64D 11/0696* (2013.01); *B60N 2/01558* (2013.01); *B60N 2/01575* (2013.01); *B60N 2/01583* (2013.01)

(58) Field of Classification Search
CPC B64D 11/0696; B64D 11/06; B60N 2/01558; B60N 2/01575; B60N 2/01583; B60N 2/015; B60N 2/01508; B60N 2/01516; B60N 2/01566

See application file for complete search history.

(56) References Cited

U.S. PATENT DOCUMENTS

| | | | |
|---|---|---|---|
| 3,241,501 A | 3/1966 | Watts | |
| 3,282,229 A | 11/1966 | Elsner | |
| 3,589,486 A | 6/1971 | Kelch | |
| 3,677,195 A | 7/1972 | Prete, Jr. | |
| 4,796,837 A * | 1/1989 | Dowd | B64D 11/0696 244/122 R |

(Continued)

FOREIGN PATENT DOCUMENTS

| | | | |
|---|---|---|---|
| EP | 0 581 072 | 2/1994 | |
| EP | 2206623 A1 * | 7/2010 | ............ B60P 7/0815 |
| EP | 2 353 927 | 8/2011 | |

OTHER PUBLICATIONS

International Preliminary Report on Patentability, for International Application No. PCT/US2019/024026, dated Oct. 15, 2020, 8 pages.

(Continued)

*Primary Examiner* — Anita M King
(74) *Attorney, Agent, or Firm* — Seed Intellectual Property Law Group LLP

(57) ABSTRACT

A seat track fitting assembly can include a seat track having a channel sized and shaped to removably, coupleably receive a seat track fitting, which seat track fitting can include a central flange having a lug aperture which is sized and shaped to be coupleable to a payload component, and at least a pair of shear pads, with each one of the shear pads protruding outwardly from opposing sides of the central flange and including a shear flange, and a tensile flange, wherein the tensile flange and the shear flange are integrally formed with the central flange. Related methods are also provided.

23 Claims, 11 Drawing Sheets

(56) References Cited

U.S. PATENT DOCUMENTS

| | | | |
|---|---|---|---|
| 5,236,153 A | 8/1993 | Laconte | |
| 5,449,132 A * | 9/1995 | Gilbert | B64D 11/0696 |
| | | | 244/122 R |
| 5,765,978 A | 6/1998 | Looker et al. | |
| 5,871,318 A * | 2/1999 | Dixon | B60N 2/01558 |
| | | | 244/118.1 |
| 6,902,365 B1 | 6/2005 | Dowty | |
| 7,455,276 B2 * | 11/2008 | Frey | B60N 2/01575 |
| | | | 244/118.6 |
| 8,128,326 B2 | 3/2012 | Hudson | |
| 8,668,181 B2 * | 3/2014 | Dazet | B64D 11/00 |
| | | | 248/503.1 |
| 8,858,138 B2 * | 10/2014 | Hearn | B60N 2/01508 |
| | | | 410/105 |
| 2007/0018047 A1 * | 1/2007 | Wodak | B64D 11/0696 |
| | | | 244/122 R |
| 2016/0107542 A1 * | 4/2016 | Trimble | B60N 2/01575 |
| | | | 296/65.03 |
| 2020/0086966 A1 * | 3/2020 | Chadwell | B64C 1/18 |

OTHER PUBLICATIONS

International Search Report and Written Opinion for International Application PCT/US2019/024026, dated May 27, 2019, 14 pages.

\* cited by examiner

PAYLOAD ATTACHMENT FITTING AND METHODS TO USE THE SAME

BACKGROUND

Technical Field

The present disclosure generally relates to aircraft payload attachment fittings and related assemblies and apparratuses.

Description of the Related Art

In aircraft structures, payload components can include a wide variety of components, such as aircraft seats, cargo palettes, monuments, galleys, lavatories, etc. Such payload components are typically coupled to a floor structure of an aircraft via payload component fittings. For the purpose of brevity, payload fittings will be described herein as comprising seat track fittings; however, other types of payload fittings are generally similar in design and include similar installation/uninstallation methods. Accordingly, reference to seat track fittings herein should not be construed as limiting to a particular application, e.g., installation of seats. As such, reference to seat track fittings should be interpreted as encompassing various other types of aircraft payload fittings.

In general, aircraft seat assemblies are coupled to a seat track via the seat track fitting. Conventional seat track fittings typically include flat, horizontally planar shear pads. During installation, seat track fittings are inserted into a channel of a seat track and translated via a subsequent translation motion to align the seat track fitting into a position where portions of the seat track fitting may be in engagement with internal structural surfaces of the seat track. Thereafter, locking mechanisms of the seat track fitting may be actuated to secure the seat track fitting. To unsecure the seat track fitting requires reversal of the steps involved in securing the seat track fitting, including disengaging the locking mechanism and translating the seat track fitting in an opposition direction.

Generally, conventional seat track fittings are sized and shaped to react loads being transferred from the coupled payload components. Conventional seat track fitting designs described above can be understood as having shear pads cantilevering out from a central flange of the seat track fitting body on either side thereof. Such cantilevered shear pad design results in a cantilevered load path to react vertical, i.e., z-direction loads, resulting in bending stresses in the seat track tabs and seat track fitting. Longitudinal or horizontal loads, i.e., x-direction loads, are reacted by a shear plunger of the locking mechanism.

The inventors of the present disclosure have surprisingly and unexpectedly discovered through experimentation and testing that conventional seat track fittings have limited strength capabilities. In particular, seat track fitting shear pads tend to fracture or, more generally, fail, at loads between approximately 11,000 lbs to 14,000 lbs, due to bending stresses caused by cantilevered load paths. Moreover, due to strict weight restriction requirements of aircraft designs, solutions to address strength capabilities of seat track fittings have been limited.

BRIEF SUMMARY

In various implementations, seat track fitting assemblies with robust and efficient form factors include seat track fittings that improve payload load carrying capability.

For example, in one example, non-limiting implementation, a seat track fitting assembly includes a seat track having a channel sized and shaped to removably, coupleably receive a seat track fitting, which seat track fitting can comprise a central flange having a lug aperture which is sized and shaped to be coupleable to a payload component and at least a pair of shear pads. Each one of the shear pads can protrude outwardly from opposing sides of the central flange, and can include a shear flange and a tensile flange, wherein the tensile flange and the shear flange are integrally formed with the central flange.

For example, in another example, non-limiting implementation, a seat track fitting assembly can comprise a seat track having a plurality of first recesses spaced apart by lip portions, and a seat track fitting moveable between an insertion position and an installed position. The seat track fitting can include a central flange and at least a pair of shear pads. Each one of the shear pads can protrude outwardly from opposing sides of the central flange, and can include a shear flange and a tensile flange, wherein the tensile flange and the shear flange are integrally formed with the central flange.

For example, in another example, non-limiting implementation, a method for securing a seat track fitting having at least a pair of shear pads to a seat track, where each shear pad includes a shear flange and a tensile flange, can comprise inserting the seat track fitting in the seat track via a first recess of the seat track, the inserting including positioning first side surfaces of the shear flanges against an edge of the first recess, and moving the seat track fitting in a first longitudinal direction until second side surfaces of the shear flanges are positioned against the edge of the first recess.

DETAILED DESCRIPTION

Figure 1:
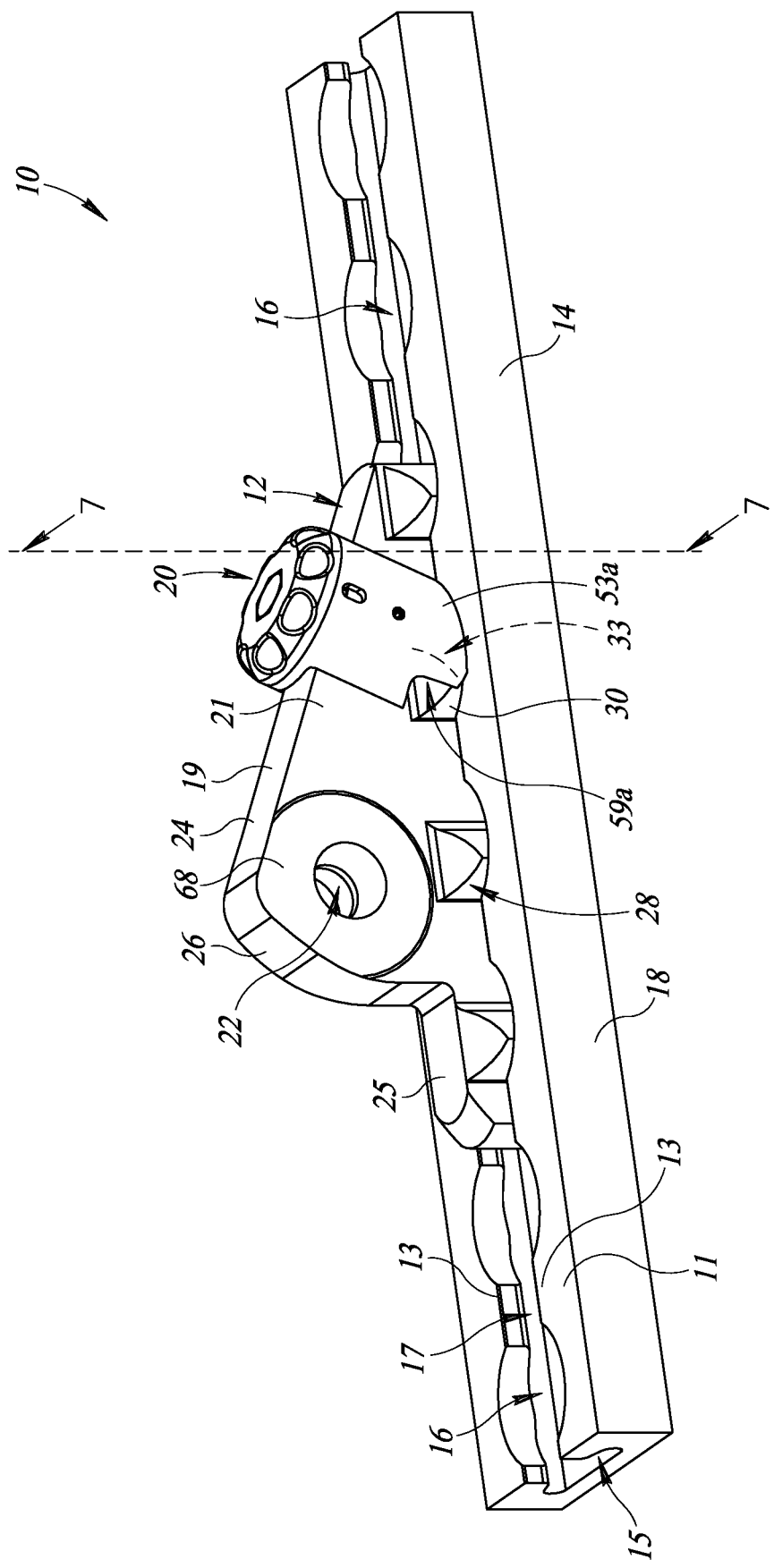
FIG. 1 is an isometric view of a seat track fitting assembly, according to one example, non-limiting implementation.

In the following description, certain specific details are set forth in order to provide a thorough understanding of various disclosed embodiments or implementations. However, one skilled in the relevant art will recognize that embodiments or implementations may be practiced without one or more of these specific details, or with other methods, components, materials, etc. In other instances, well-known structures associated with payload components, payload attachment mechanisms, and payload attachment structures of aircrafts have not been shown or described in detail to avoid unnecessarily obscuring descriptions of the embodiments. In addition, although the foregoing and following description of various embodiments or implementations describe or reference aircraft seats as an example of a payload component, other examples of payload components are within the scope of the disclosed subject matter.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment," "one implementation," "an embodiment," or "an implementation" means that a particular feature, structure or characteristic described in connection with the embodiment or implementation is included in at least one embodiment or implementation. Thus, the appearances of the phrases "in one embodiment," "in one implementation," "in an embodiment," or "in an implementation" in various places throughout this specification are not necessarily all referring to the same embodiment or implementation. Furthermore, the particular features, structures, or characteristics may be combined in any suitable manner in one or more embodiments or implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

FIGS. 1-5 illustrate a seat track fitting assembly 10 and its components, according to one example, non-limiting implementation. FIGS. 6A-7 illustrate the seat track fitting assembly in various configurations described in more detail below. The seat track fitting assembly 10 includes a seat track fitting 12 that is removably coupleable to a seat track 14. The seat track 14 can be any known in the art. In general, the seat track 14 includes a channel 15 that extends in a longitudinal direction and is defined, at least in part, by a plurality of longitudinally spaced apart first recesses 16, and by second recesses 17 that are disposed in a top flange 11. The second recesses 17 are defined by lip portions 13 that extend inwardly from respective side flanges 18, and are positioned between adjacent first recesses 16.

Figure 2:
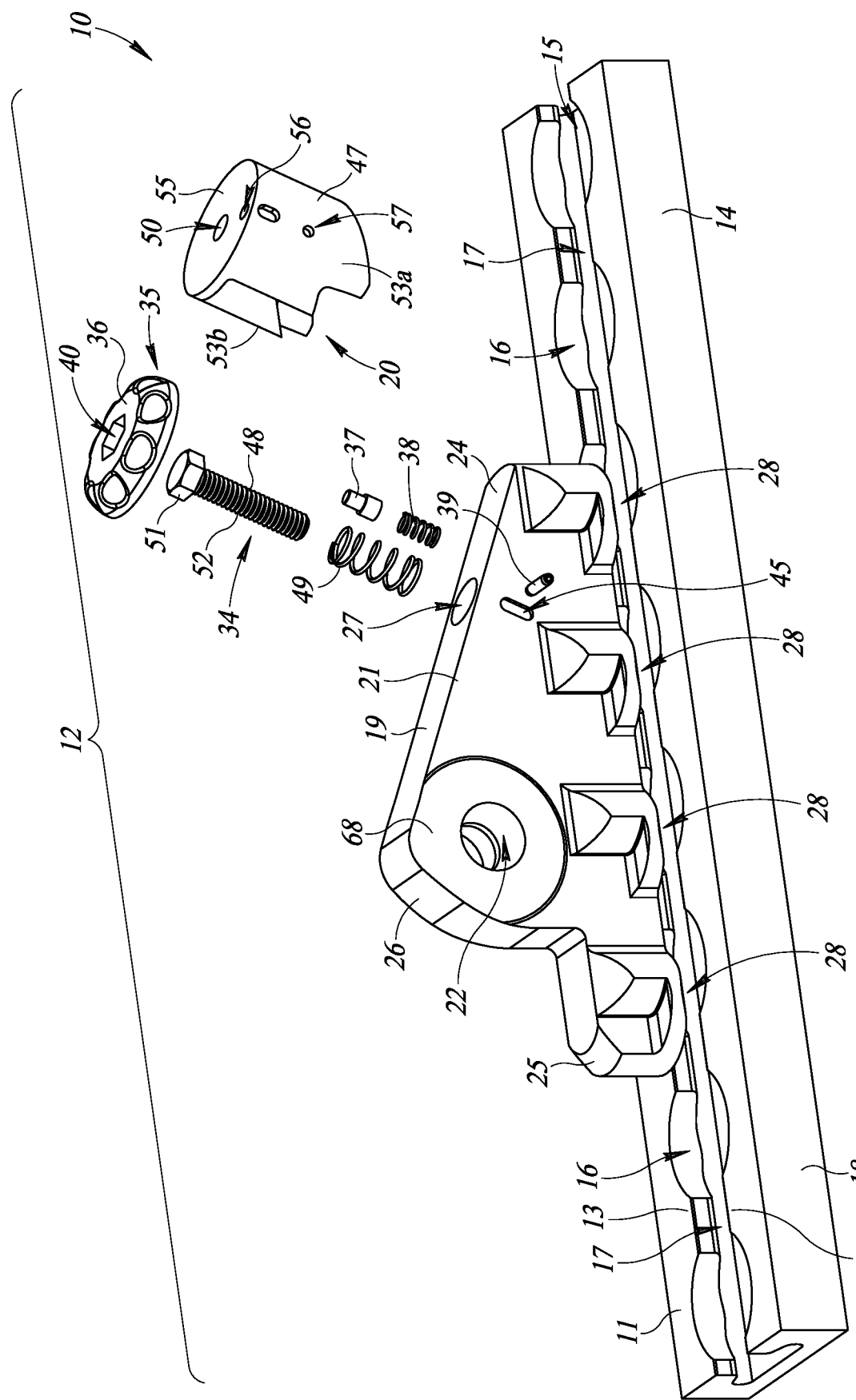
FIG. 2 is an exploded view of the seat track fitting assembly of FIG. 1.
Figure 3:
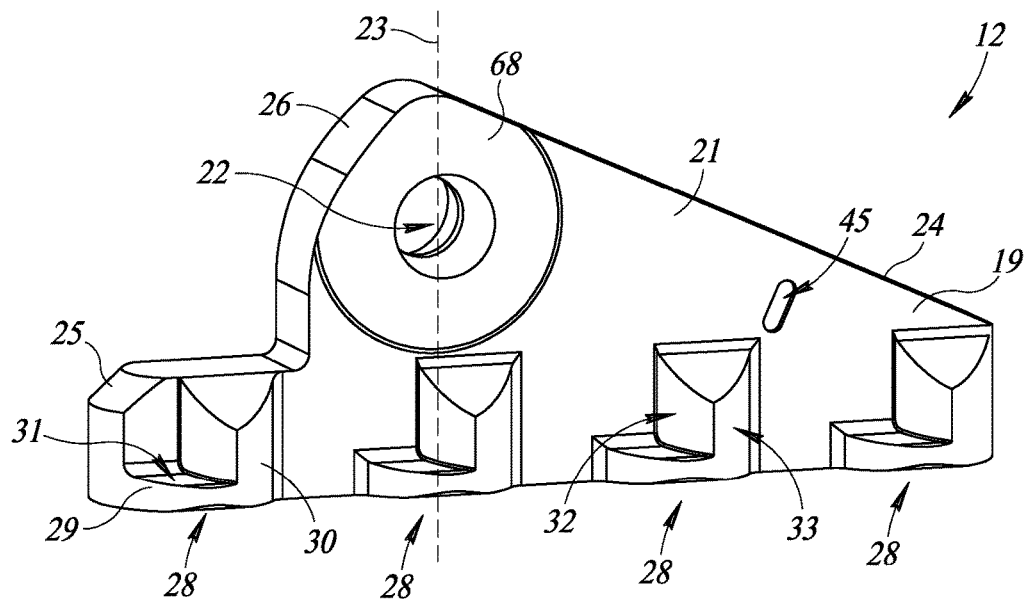
FIG. 3 is an isometric view of a seat track fitting of the seat track fitting assembly of FIG. 1.
Figure 4:
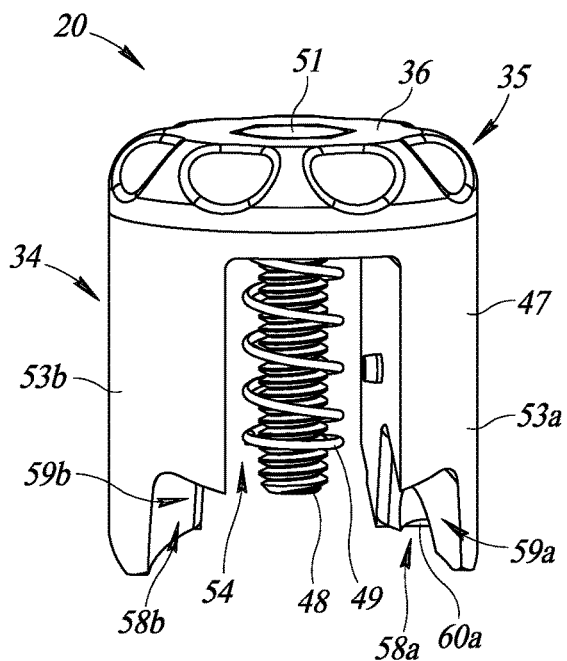
FIG. 4 is a skewed isometric view of a retainer mechanism of the seat track fitting assembly of FIG. 1.

The seat track fitting 12 includes a seat track fitting body 19 and a retention mechanism 20. The seat track fitting body 19 includes a central flange 21 that has a substantially triangular shape and includes a payload aperture 22 that extends through a lug portion 68. In general, the central flange 21 can have other sizes, shapes and forms that may be selected appropriately based on a payload component that has to be coupled to the seat track fitting 14. Similarly, the size, shape, and positioning of the payload aperture 22 can be selected appropriately based on the payload component that has to be coupled to the seat track fitting 12. As described above, the seat track fitting 12 is sized and shaped to react loads at least in excess of payload loads that can range approximately between 11,000 lbs to 14,000 lbs. Payload loads are introduced into the seat track fitting 12 via coupling the seat track fitting 12 to a payload component via the payload aperture 22, which defines a load introduction axis 23 extending vertically through a center of the payload aperture 22. The central flange 21 also includes a ramp portion 24 that extends angularly relative to the load introduction axis 23, and a front portion 25 that is defined by an arcuate portion 26 of the lug portion 68 extending from the ramp portion 24 to the front portion 25. As illustrated in FIG. 2 in detail, the ramp portion 24 also includes a bolt aperture 27 that at least partially extends therethrough.

The seat track fitting body 19 includes a plurality of spaced apart shear pads 28. A number of shear pads 28 protrude outwardly from one side of the central flange 21, and another number of shear pads 28 protrude outwardly from another, opposing side of the central flange 21. In general, the shear pads 28 protruding from one side of the central flange 21 are a mirror image of the shear pads 28 protruding from the other, opposing side of the central flange 21 about a central vertical axis of the seat track fitting body 19.

As described above, conventional seat track fittings are limited in their strength capabilities, and tend to structurally fail at loads of between 11,000 lbs and 14,000 lbs. The inventors have surprisingly and unexpectedly discovered, through experimentation and testing, that the various implementations of seat track fittings having the shear pads described herein can carry loads exceeding 11,000 lbs to 14,000 lbs. For example, in some implementations, the seat track fittings can comprise aluminum, steel, or its various alloys. Such seat track fittings have been unexpectedly and surprisingly discovered to withstand payload loads of at least 14,000 lbs and higher, and even exceeding 21,000 lbs.

In particular, each shear pad 28 includes integrally formed tensile flange 29 and shear flange 30. The tensile flange 29 includes an upper surface 31 that is sized and shaped to be received in the channel 15 as described in more detail below. The shear flange 30 extends upwardly from the tensile flange 29, and includes a first side surface 32 and a second side surface 33. The first and second side surfaces 32, 33 define a substantially arcuate profile that generally matches a profile of the first recess 16 of the seat track 14.

Each shear pad 28 is sized and shaped to react both shear loads and tensile loads introduced by the payload components. In particular, the shear flange 30 is sized and shaped to react shear loads, e.g., fore-aft loads, and the tensile flange 29 is sized and shaped to react tensile loads, e.g., up-down loads. Thus, unlike conventional seat track fittings that require a plunger to be rotatably inserted into the seat track to react shear loads, the seat track fitting 12 is capable of reacting both shear and tensile loads via the same shear pad 28 that includes integrally formed tensile flange 29 and shear flange 30.

The retention mechanism 20 is generally configured to secure the seat track fitting 12 into the seat track 14 when the seat track fitting 12 is in an installed configuration. In particular, the retention mechanism 20 includes a securement mechanism 34 and a unitary rotary mechanism 35. The unitary rotary mechanism 35 includes a knob member 36, a shaft member 37, a first biasing member 38, e.g., a spring, and a pin 39. The knob member 36 includes an aperture 40 that extends therethrough, and a lower surface 41 that includes a plurality of circumferentially spaced apart cavities 42. Each cavity 42 includes a ramp surface 43 that extends from an edge of the cavity 42 and tapers toward a center of the cavity 42. One end of the shaft member 37 is sized and shaped to be received in the cavity 42. Another end of the shaft member 37 includes the first biasing member 38 coupled thereto. The first biasing member 38 is sized and shaped to urge the shaft member 37 toward the cavity 42 of the knob member 36. The pin 39 is coupled to the first biasing member 38, and extends inwardly at a substantially perpendicular orientation relative to a central axis of the shaft member 37. More generally, the pin 39 is sized, shaped, and oriented to be slideably received in a slot 45 disposed in the central flange 21 of the seat track fitting body 19.

Figure 5:
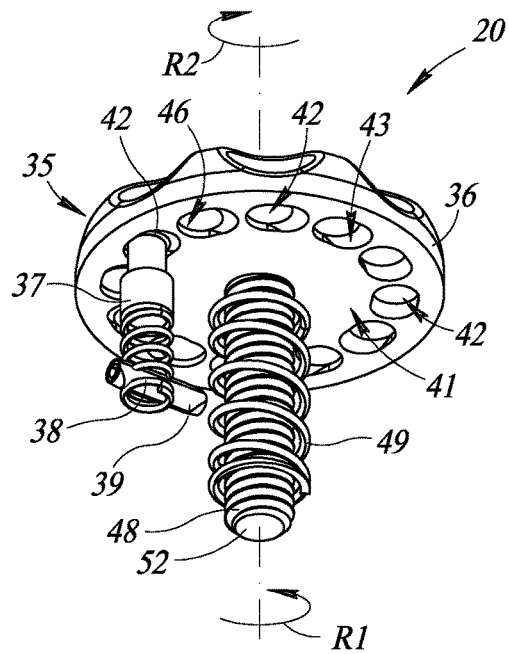
FIG. 5 is a skewed isometric view of the retainer mechanism of the seat track fitting assembly of FIG. 1, with certain components removed for clarity of description and illustration.
Figure 6A:
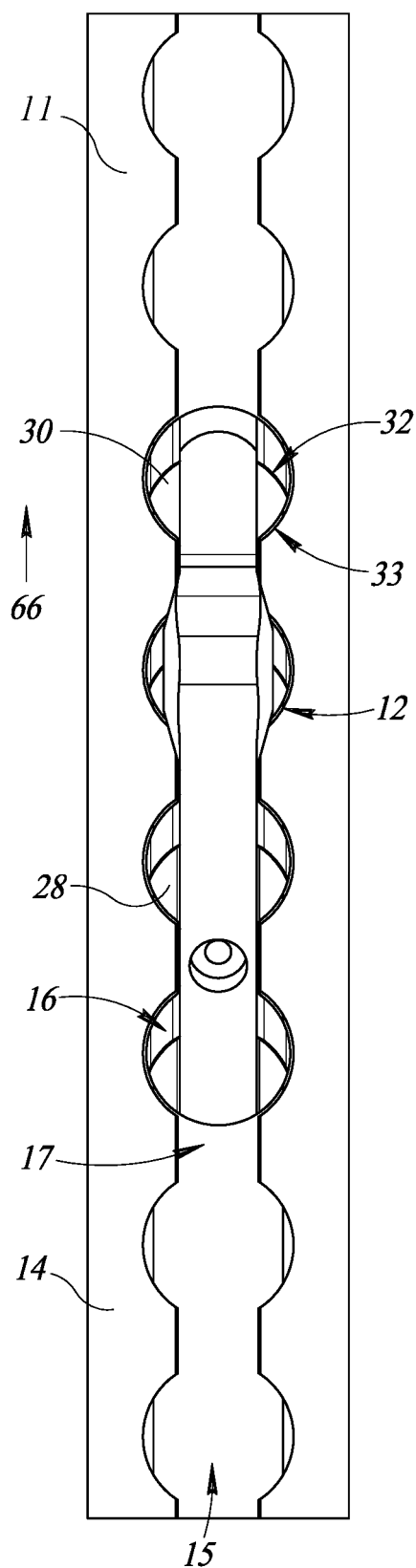
FIG. 6A is a plan view of the seat track fitting assembly of FIG. 1, showing the seat track fitting assembly in an insertion configuration.

As illustrated in detail in FIG. 5, where certain components of the securement mechanism 34, e.g., housing, are removed for clarity of illustration and description, the ramp surface 43 permits rotary direction in one direction R1, e.g., a clockwise direction, where rotary movement in a counter direction R2, e.g., a counterclockwise direction, is resisted by the substantially flat vertical surface 46 of knob member 36 defined by the cavity 42, which is positioned at an end opposite of the ramp surface 43.

The securement mechanism 34 includes a housing 47, a fastener 48, and a second biasing member 49, e.g., a spring. The housing 47 is generally hollow, and includes a fastener aperture 50 extending therethrough. The fastener aperture 50 is generally concentric with the aperture 40 of the knob member 36. The fastener 48 has a head portion 51 that is sized and shaped to be coupleably received in the aperture 40 of the knob member 36, and a shaft portion 52 that extends through the aperture 40 of the knob member 36, the fastener aperture 50 of the housing 47, and is coupleably received by the bolt aperture 27 of the central flange 21 of the seat track fitting body 19. The second biasing member 49 is sized and shaped to be coupleably received by the shaft portion 52 of the fastener 48.

As described above, the housing 47 is generally hollow. In particular, the housing 47 includes a pair of sidewalls 53a, 53b that are spaced apart to define a flange receiving region 54. The housing 47 also includes an upper side 55. The flange receiving region 54 is sized and shaped to receive therein the central flange 21 of the seat track fitting body 19. The upper side 55 is generally sized and shaped to be coupled to the knob member 36. The upper side 55 includes a shaft aperture 56, which is sized and shaped to receive the shaft member 37 and the first biasing member 38 when the unitary rotary mechanism 35 is coupled to the securement mechanism 34. One of the pair of sidewalls 53, e.g., sidewall 53a, includes a pin aperture 57 that is sized and shaped to coupleably receive the pin 39 of the unitary rotary mechanism 35. The sidewalls 53a, 53b, include respective flange recesses 58a, 58b, with each flange recess 58a, 58b defining interior surfaces 59a, 59b, which have an arcuate profile that is sized and shaped to coupleably surround the second side surface 33 of the shear pad 28. Each sidewall 53a, 53b includes respective tabs 60a, 60b that protrude outwardly from a respective lower surface 61a, 61b (FIG. 7). Each tab 60a, 60b has a generally arcuate profile which is sized and shaped to match a profile of the first recess 16 of the seat track 14.

Figure 6B:
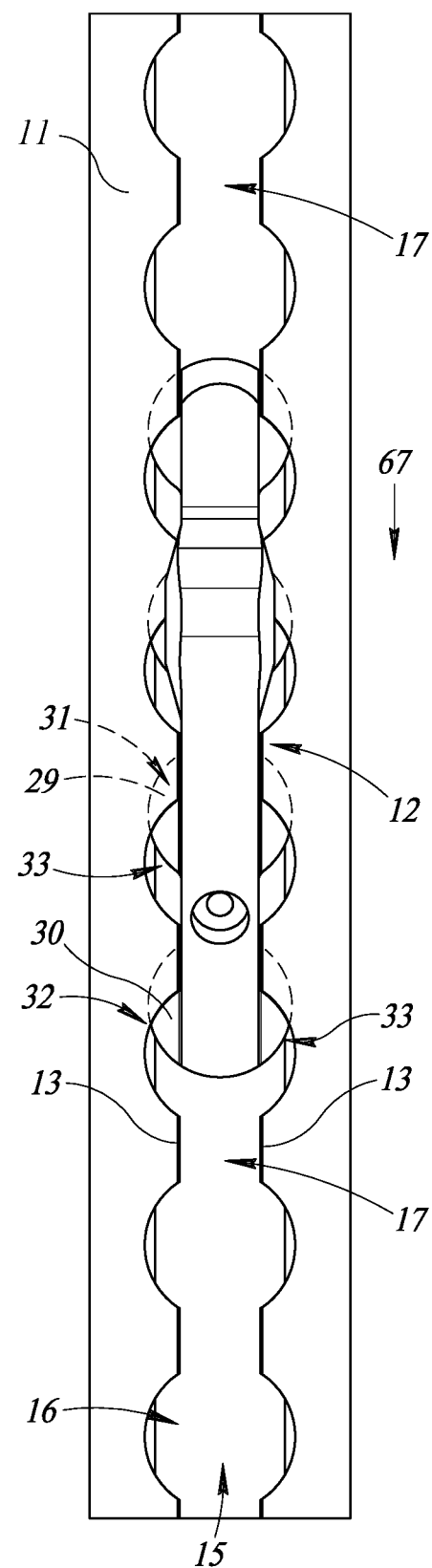
FIG. 6B is a plan view of the seat track fitting assembly of FIG. 1, showing the seat track fitting assembly in an installed configuration.
Figure 7:
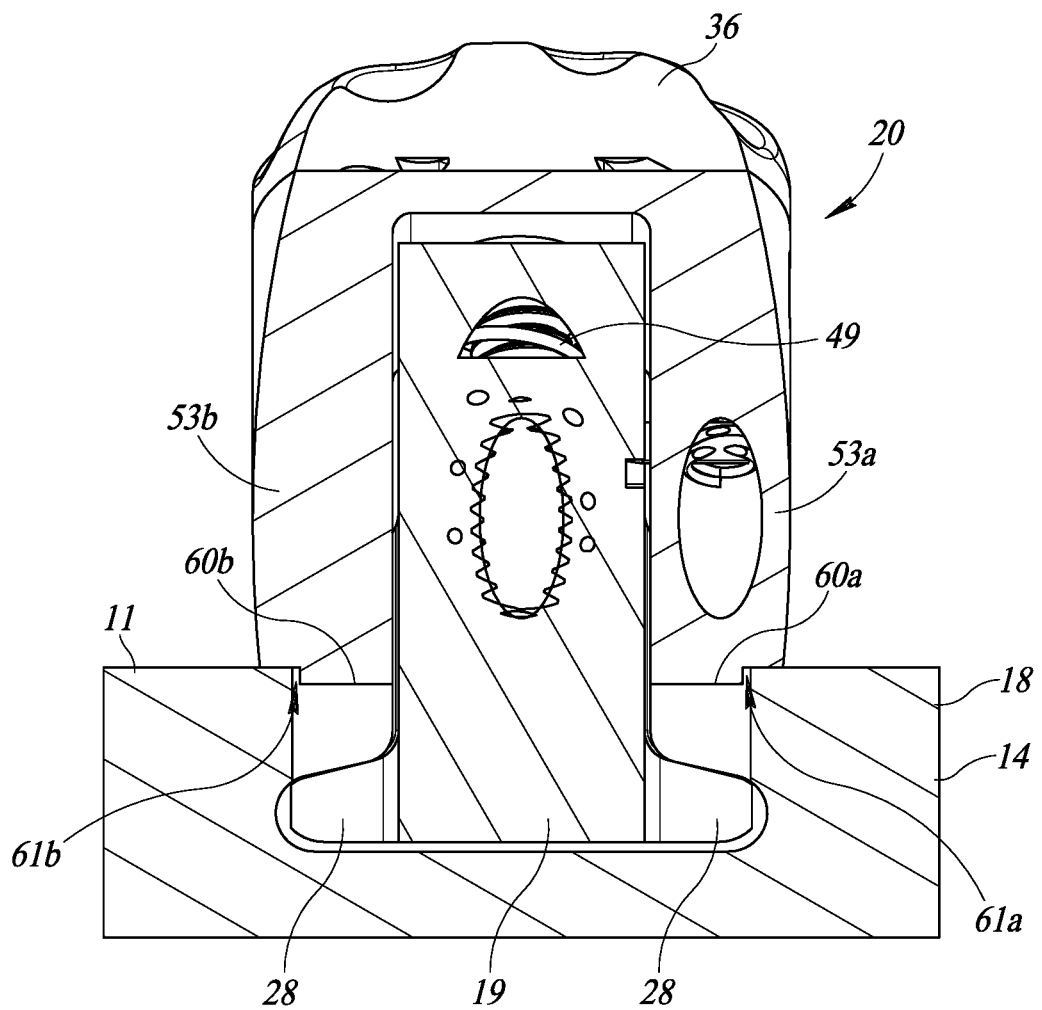
FIG. 7 is a cross-sectional view of the seat track fitting assembly of FIG. 1, taken along lines 7-7, showing the seat track fitting assembly in a secured configuration.

FIGS. 6A-7 illustrate various configurations of the seat track fitting assembly 10. In particular, FIG. 6A illustrates a plan view of the seat track fitting assembly 10 in an insertion configuration, wherein the seat track fitting 12 is inserted in the seat track 14. FIG. 6B illustrates a plan view of the seat track fitting assembly 10 in an installed configuration. FIG. 7 illustrates a cross-sectional view of the seat track fitting assembly 10 in the secured configuration.

Thus, in operation, the seat track fitting 12 is inserted in the seat track 14, whereby the shear pads 28 are received in the seat track 14 via first recesses 16 of the seat track 14, with the second side surfaces 33 of the shear flanges 30 abutting or mating with the arcuate surfaces of the first recesses 16 when the seat track fitting 12 is received in the seat track 14. The seat track fitting 12 is thereafter slideably moved in the channel 15 of the seat track 14 in a first direction 66. In particular, during the slideable movement, the tensile flanges 29 move from edges of first recesses 16 toward other opposing edges of the first recesses 16, proximate to the second recesses 17. As the first side surfaces 32 of the shear flanges 30 abut or mate with the arcuate surface of the first recesses 16 of the seat track 14, the tensile flanges 29 are positioned in the second recesses 17 of the seat track 14, with upper surfaces 31 of the tensile flanges 29 positioned adjacent to lower surfaces of lip portions 13 of the seat track 14, as illustrated in FIG. 6B.

When the seat track fitting 12 is positioned in the installed configuration, the retention mechanism 20 is actuated so the seat track fitting assembly 10 is in the secured configuration. In particular, in the insertion and installed configurations, the housing 47 of the securement mechanism 34 is raised such that the tabs 60a, 60b are not received in the first recess 16. Thereafter, the knob member 36 is rotated in a rotary direction R1, e.g., a clockwise direction, which causes the head portion 51 of the fastener 48 to rotate therewith. As described above, the first biasing member 38 is sized and shaped to urge the shaft member 37 toward the cavity 42 of the knob member 36. The ramp surfaces 43 permit a unitary rotary movement of the knob member 36 in the R1 direction only, e.g., in the clockwise direction.

The second biasing member 49 urges the knob member 36 away from the seat track fitting body 19. However, rotary movement of the knob member 36 coupleably moves or drives the fastener 48, or more particularly, the shaft portion 52 of the fastener 48, into the ramp portion 24 of the seat track fitting body 19 via the bolt aperture 27, overcoming the biasing forces of the second biasing member 49 urging the knob member 36 away from the seat track fitting body 19. As the fastener 48 is moved in this manner, the knob member 36, along with the pin 39 coupleably received in the pin aperture 57 of the housing 47, moves the housing 47 toward the first recess 16 of the seat track 14. As described above, the pin 39 is slideably received in the slot 45 disposed in the central flange 21 of the seat track fitting body 19, which permits the securement mechanism 34 and the unitary rotary mechanism 35 to move relative to the seat track fitting body 19. Moreover, as the lower surface of the knob member 36 and housing 47 move toward, and abut or contact the ramp portion 24 of the seat track fitting body 19, interior surfaces 59a, 59b of the sidewalls 53a, 53b mate with and surround the second side surfaces 33 of the shear pads 28 (FIG. 1), with the tabs 60a, 60b being received in the first recess 16 of the seat track 14 as illustrated in FIG. 7. Accordingly, the seat track fitting 12 is secured to the seat track 14.

To unsecure, uninstall, and disinsert the seat track fitting 12 from the seat track 14 requires the reversal of the steps described above. For example, to unsecure the seat track fitting 12 from the seat track 14, the head portion 51 of the fastener 48 by rotating the fastener in a direction R2 moves or decouples the fastener 48 away from the ramp portion 24 of the seat track fitting body 19. Thereafter, the biasing forces of the second biasing member 49 overcome the frictional forces of the coupling of the fastener 48 to the ramp portion 24 of the seat track fitting body 19, and move the knob member 36 and the housing 47, including the coupled components of the unitary rotary mechanism 35 and the securement mechanism 34, away from the seat track fitting body 19. Such movement causes the tabs 60a, 60b, to be moved away from the first recess 16 of the seat track 14, thus moving the seat track fitting assembly 10 into an unsecured configuration, i.e., the installed configuration illustrated in FIG. 6B.

Thereafter, the seat track fitting 12 can be translated in a second direction 67 until the second side surfaces 33 of the shear flanges 30 abut the first recesses 16 of the seat track 14, thus moving the seat track fitting assembly 10 into the insertion configuration illustrated in FIG. 6A. The seat track fitting 12 can thereafter be removed from the seat track 14.

Figure 8:
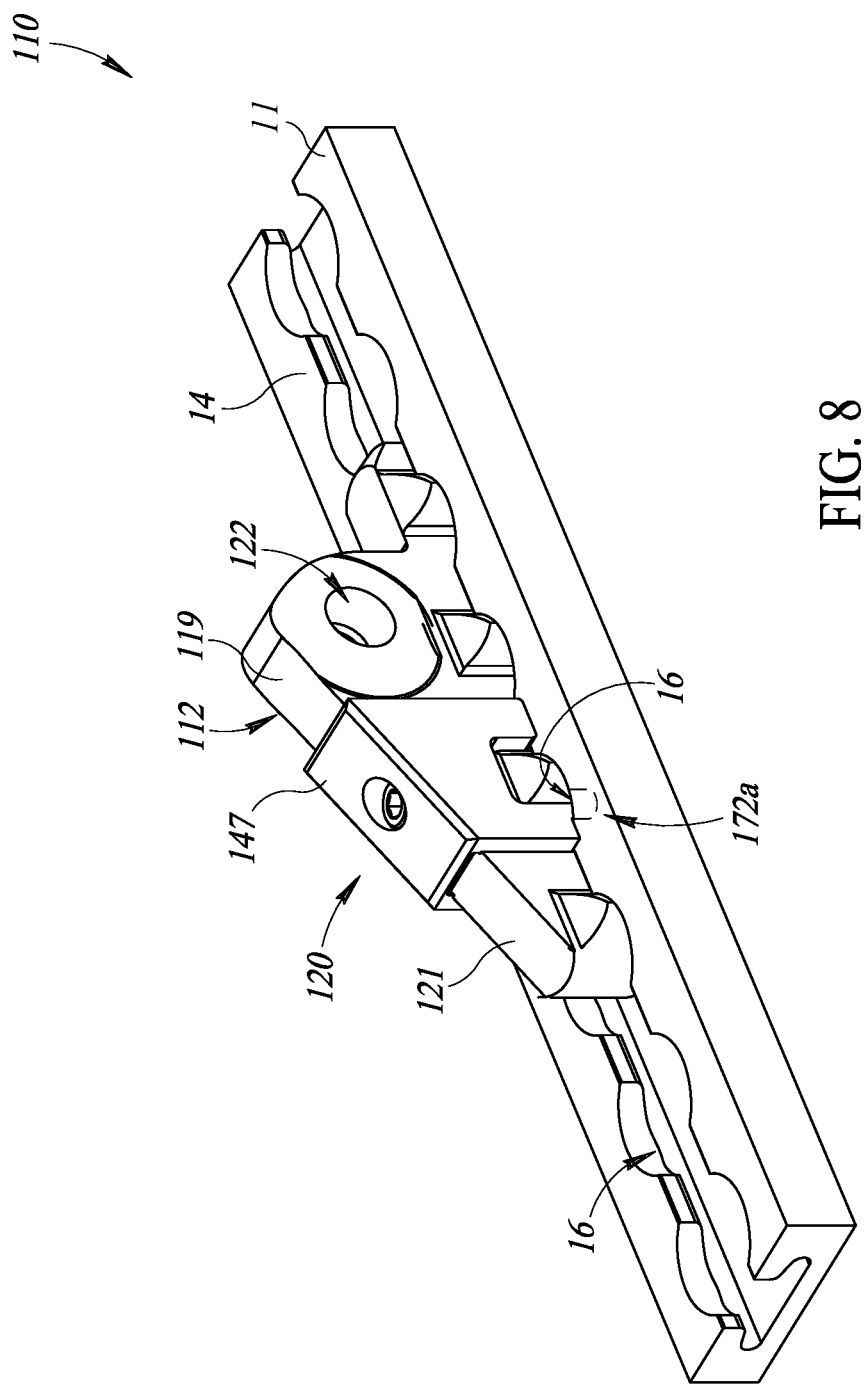
FIG. 8 is an isometric view of a seat track fitting assembly, according to another example, non-limiting implementation, illustrating the seat track fitting assembly in a secured configuration.
Figure 9:
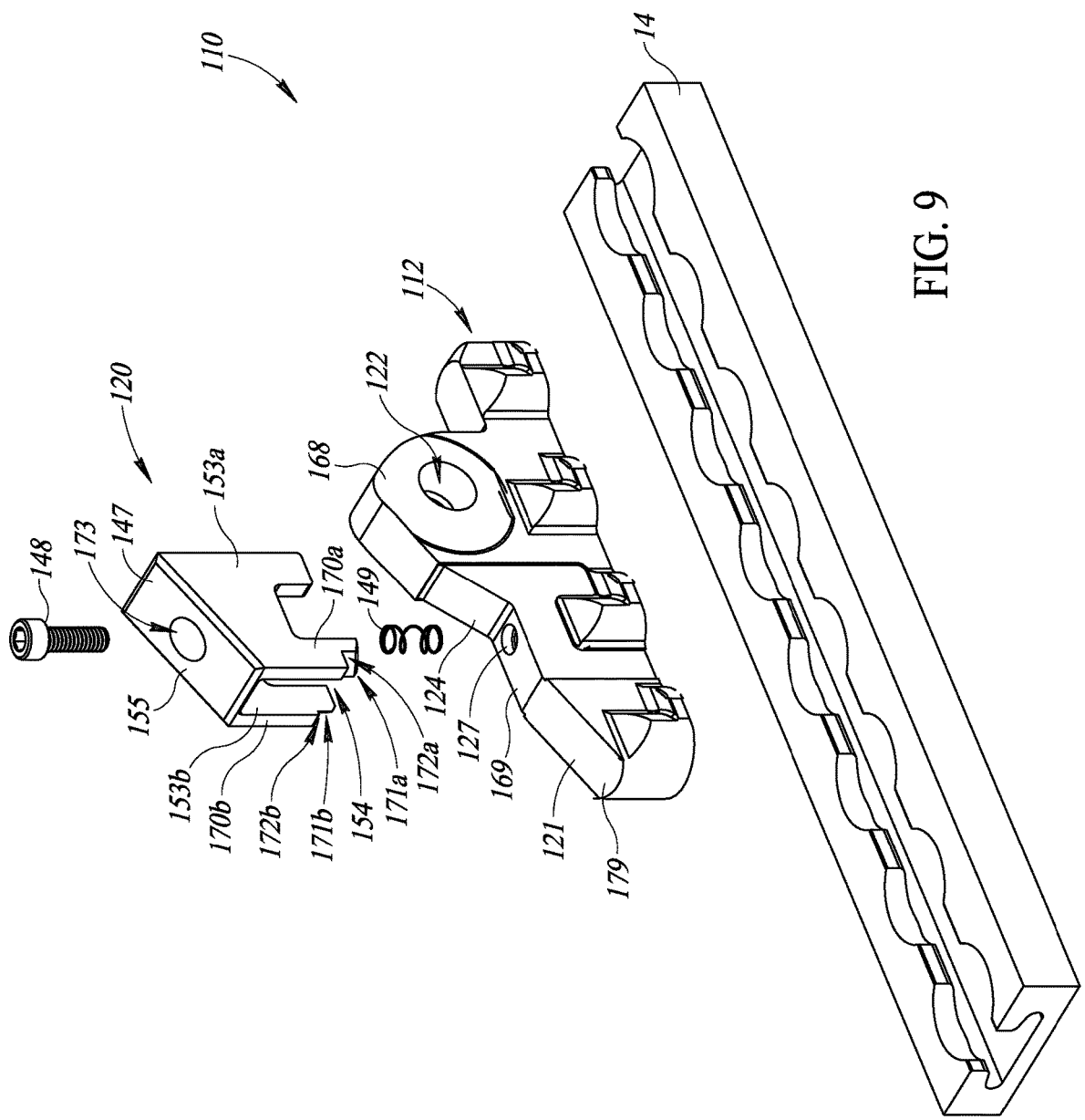
FIG. 9 is an exploded view of the seat track fitting assembly of FIG. 8.

FIGS. 8-9 illustrate a seat track fitting assembly 110, according to another example implementation. The seat track fitting assembly 110 includes a seat track fitting 112 removeably coupleable to a seat track 14. The seat track fitting 112 is generally similar to the seat track fitting 12 illustrated in FIGS. 1-7, unless indicated otherwise or illustrated in FIGS. 8-9. For example, the seat track fitting 112 includes a central flange 121 and a payload aperture 122 that extends through a lug portion 168 of the central flange 121. The central flange 121 also includes a first ramp portion 124 that extends from the lug portion 168 to a receiving portion 169, and a rear portion 179 that ramps downwardly from the receiving portion 169. The receiving portion 169 includes a bolt aperture 127 at least partially extending therethrough.

The seat track fitting assembly 110 provides a variation in a retainer mechanism 120. The retainer mechanism 120 includes a securement housing 147, a fastener 148, and a biasing member 149. The biasing member 149 is coupled to the fastener 148, and is sized and shaped to urge the securement housing 147 away from the receiving portion 169 of the seat track fitting 112.

The securement housing 147 has a pair of sidewalls 153a, 153b that are spaced apart to define a flange receiving region 154. The securement housing 147 also includes an upper side 155. The flange receiving region 154 is sized and shaped to receive therein the central flange 121 of a seat track fitting body 119. Each sidewall 153a, 153b includes a respective leg 170a, 170b. Each leg 170a, 170b includes a tab recess 171a, 171b to define respective interior surfaces 172a, 172b, which have arcuate profiles to match arcuate profiles of the first recess 16 of the seat track 14. The upper side 155 has a fastener aperture 173 which is sized and shaped to receive the fastener 148.

In operation, the seat track fitting 112 is inserted into the seat track 14 and translated in the seat track 14 in a similar manner as illustrated in FIGS. 6A, 6B. The variation in the secured configuration is illustrated in FIG. 8, which illustrates the seat track fitting assembly 110 in the secured configuration. More particularly, when the seat track fitting 112 is in the installed configuration, the fastener 148 is rotated in a first rotary direction. Such rotation causes the fastener 148 to move inwardly or be driven into the bolt aperture 127 of the receiving portion 169 of the central flange 121 of the seat track fitting body 119. As the fastener 148 is moved inward, such causes downward movement of the securement housing 147 by contact of the fastener 148 with a surface disposed on the upper side 155, and the biasing forces of the biasing member 149 are overcome by frictional forces of the coupling of the fastener 148 with the seat track fitting 112. As the securement housing 147 is moved toward the first recess 16 of the seat track 14, the interior surfaces 172a, 172b are received in first recess 16 of the seat track 14. Accordingly, the seat track fitting 112 is secured to the seat track 14.

To unsecure, uninstall, and disinsert the seat track fitting 112 from the seat track 14 requires the reversal of the steps described above. For example, to unsecure the seat track fitting 112 from the seat track 14, the fastener 148 can be rotated in a second rotary direction, opposite to the first rotary direction, which moves or decouples the fastener 148 away from the receiving portion 169 of the seat track fitting body 119. Thereafter, the biasing forces of the biasing member 149 overcome the frictional forces of the coupling of the fastener 148 to the receiving portion 169 of the seat track fitting body 119, and the securement housing 147 is moved away from the seat track fitting body 119. Such movement causes the interior surfaces 172a, 172b to be moved away from the first recess 16 of the seat track 14, thus moving the seat track fitting assembly 110 into an unsecured configuration, e.g., the installed configuration as illustrated in FIG. 6B.

Thereafter, the seat track fitting 112 can be translated until second side surfaces, e.g., second side surfaces 33 of shear flanges, e.g., shear flanges 30, abut the first recesses 16 of the seat track 14, thus moving the seat track fitting assembly 110 into the insertion configuration, for example, as illustrated in FIG. 6A. The seat track fitting 112 can thereafter be removed from the seat track 14.

Figure 12:
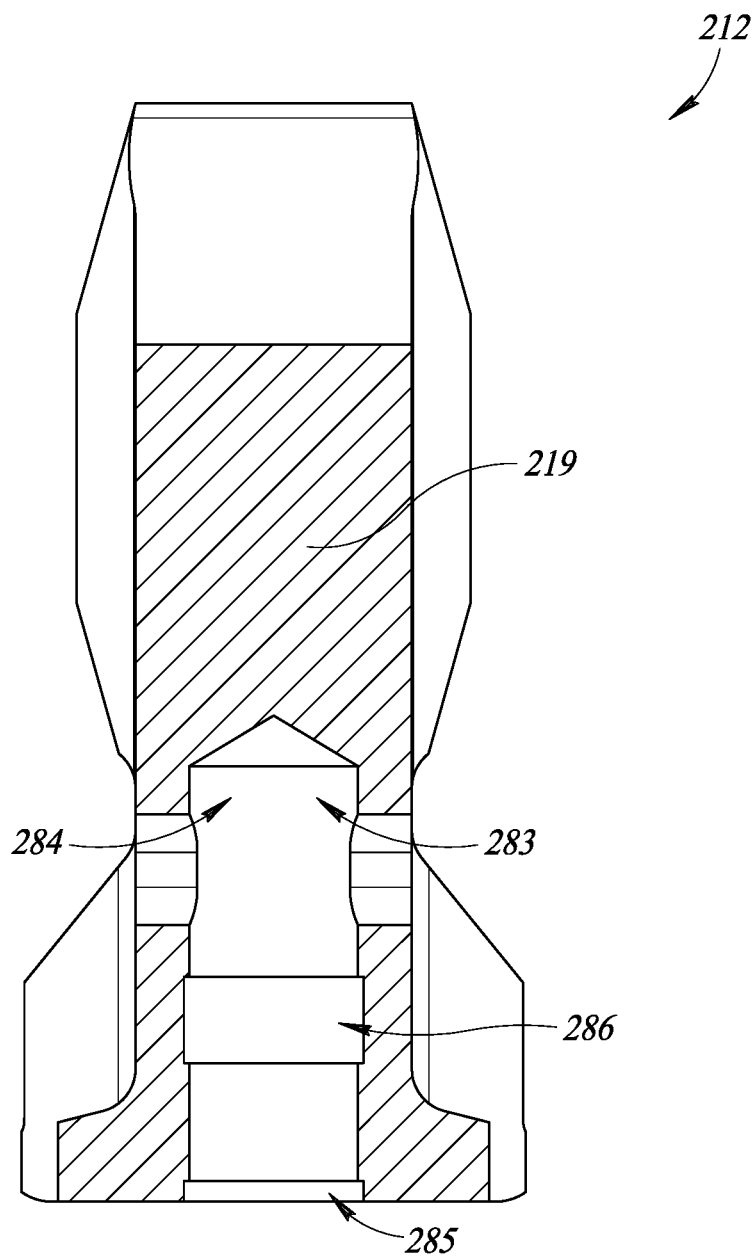
FIG. 12 is a cross-sectional view of a seat track fitting of the seat track fitting assembly of FIG. 11, taken along lines 12-12.

FIGS. 10-13 illustrate a seat track fitting assembly 210, according to another example, non-limiting implementation, with FIG. 12 illustrating a cross-sectional view of a seat track fitting 212 of the seat track fitting assembly 210. The seat track fitting assembly 210 includes the seat track fitting 212 removeably coupleable to a seat track 14. The seat track fitting 212 is generally similar to the seat track fittings 12, 112 illustrated in FIGS. 1-9, unless indicated otherwise or illustrated in FIGS. 10-13. For example, the seat track fitting 212 includes a seat track fitting body 219 having a central flange 221 and a payload aperture 222 that extends through a lug portion 268 of the central flange 221. A pin slot aperture 280 extends through the central flange 221, and a pin aperture 281 extends through the central flange 221.

The central flange 221 also includes a ramp portion 224 that extends or ramps downwardly from the lug portion 268. The seat track fitting body 219 of the seat track fitting 212 includes a bore 283 that partially extends therethrough. The bore 283 includes a primary chamber 284, a lower chamber 285, and an upper chamber 286. As illustrated in detail in FIG. 12, the primary chamber 284 has a diameter that is less than a diameter of the lower chamber 285 and a diameter of the upper chamber 286.

Figure 10:
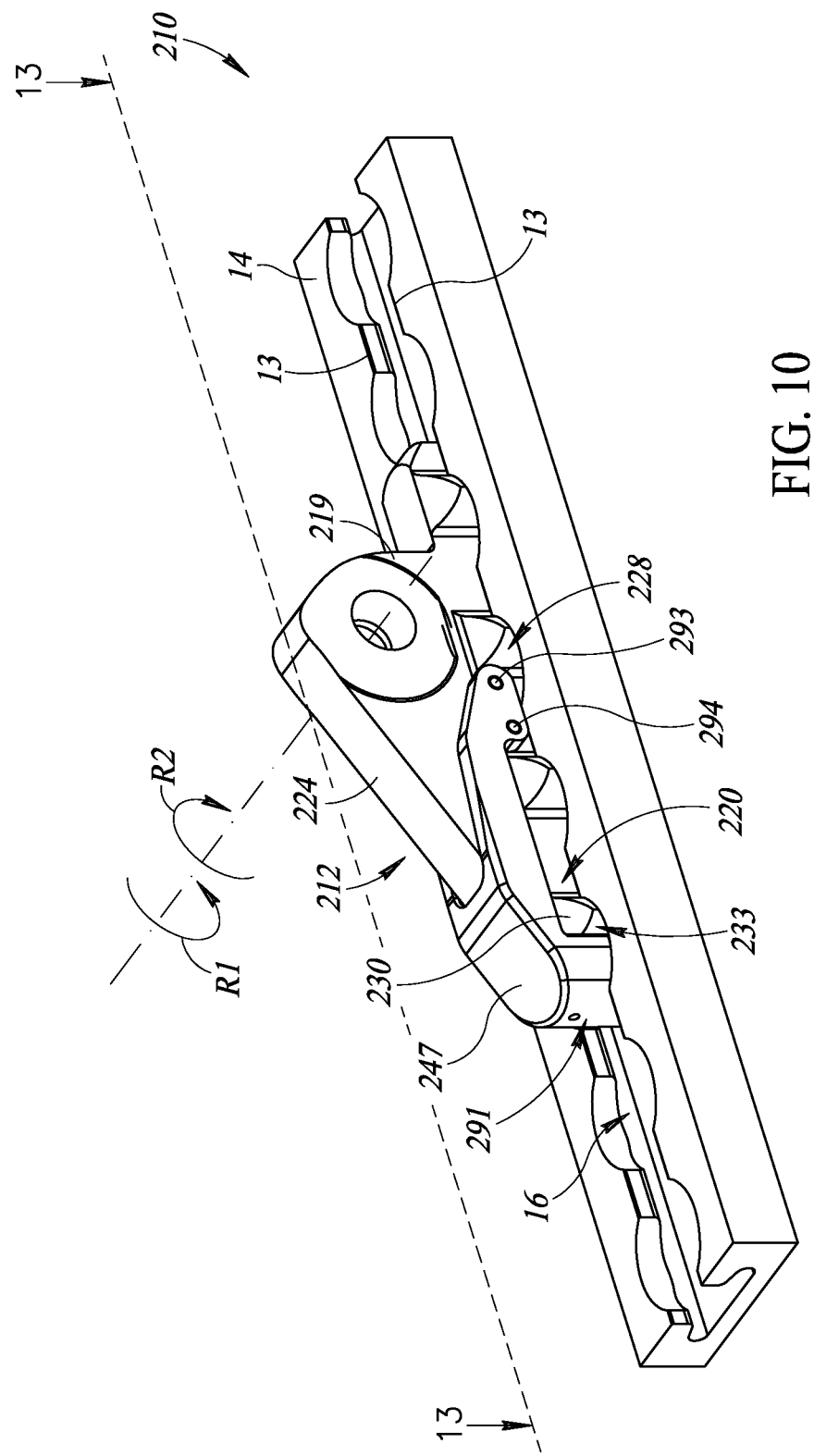
FIG. 10 is an isometric view of a seat track fitting assembly according to another example, non-limiting implementation, illustrating the seat track fitting assembly in a secured configuration.
Figure 11:
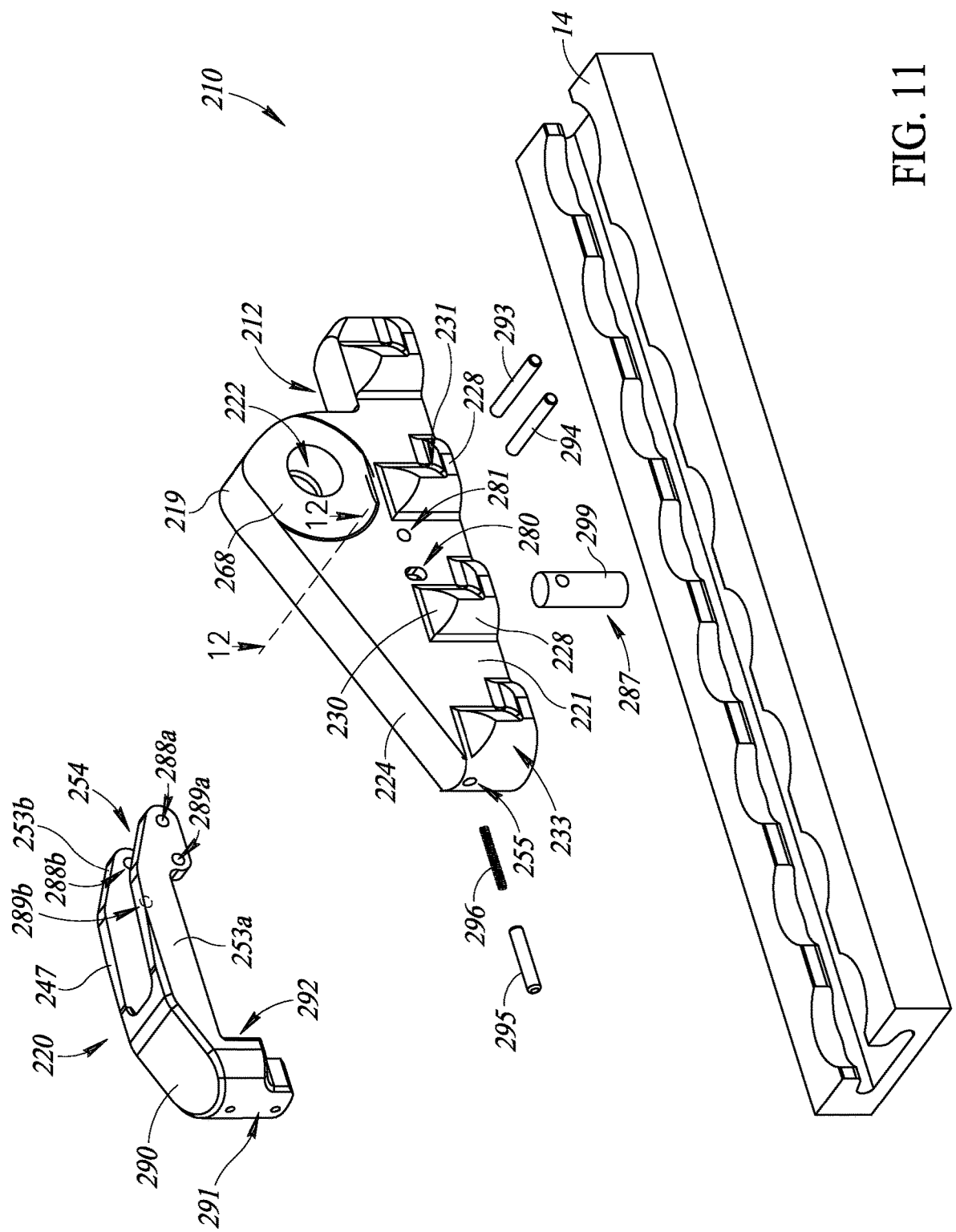
FIG. 11 is an exploded view of the seat track fitting assembly of FIG. 10.
Figure 13:
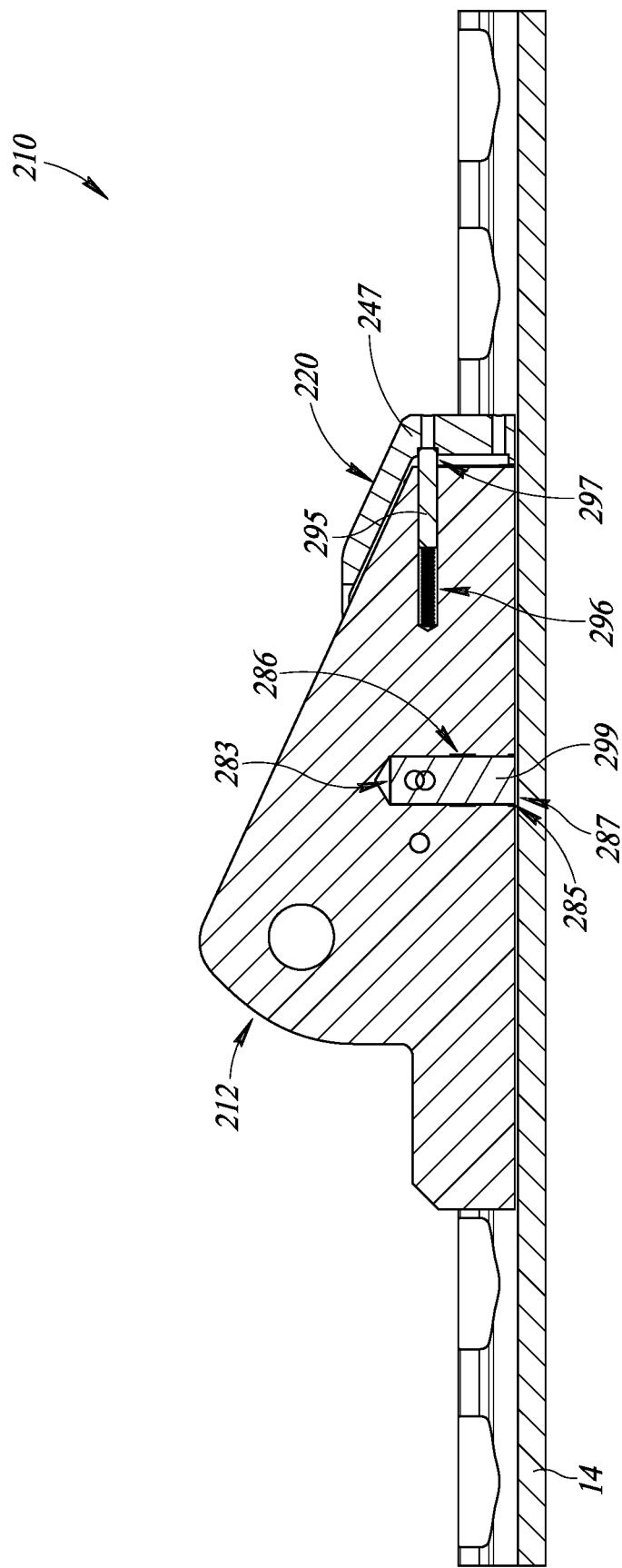
FIG. 13 is a cross-sectional view of the seat track fitting assembly of FIG. 10, taken along lines 13-13.

The seat track fitting assembly 210 provides a variation in a retainer mechanism 220, and includes an anti-rattle feature 287. The retainer mechanism 220 includes a hand lever 247 having a pair of sidewalls 253a, 253b that are spaced apart to define a flange receiving region 254. The flange receiving region 254 is sized and shaped to receive therein the central flange 221 of the seat track fitting body 219. Each sidewall 253a, 253b includes respective first pin apertures 288a, 288b and second pin apertures 289a, 289b that extend therethrough. The hand lever 247 also includes a rear portion 290 having an arcuate profile which defines an outer surface 291 and an interior surface 292. The outer surface 291 is sized and shaped to be received in the first recess 16 of the seat track 14, and the interior surface 292 is sized and shaped to surround second side surface 233 of a shear flange 230 of a shear pad 228 when the seat track fitting assembly is in a secured configuration, as illustrated in FIG. 10. More particularly, the hand lever 247 is pivotably rotatable with respect to the seat track fitting body 219 via a first pin 293 and a second pin 294. The first pin 293 pivotably couples the hand lever 247 to the seat track fitting body 219 via first pin apertures 288a, 288b and pin aperture 281 disposed in the central flange 221. The second pin 294 pivotably couples the hand lever 247 to the seat track fitting body 219 via second pin apertures 289a, 289b and pin slot aperture 280 disposed in the central flange 221. The pin slot aperture 280 is sized and shaped to allow the second pin 294 to slideably move therein, which facilitates accounting for various manufacturing tolerances. The retainer mechanism 220 also includes a securement pin 295 and a securement biasing member 296, e.g., a spring, coupled to the securement pin 295. The securement pin 295 is coupleably received in a securement pocket 297 disposed in the rear portion 290 of the seat track fitting body 219 (FIG. 13).

As described above, the seat track fitting assembly 210 also includes an anti-rattle feature 287. The anti-rattle feature 287 is generally configured to prevent or restrict rattling or excessive movement of the seat track fitting 212 caused by, for example, manufacturing tolerances. The anti-rattle feature 287 comprises a plunger 299 that has a substantially cylindrical shape. The plunger 299 comprises an elastomer that has appropriate hardness properties to resist indentation. For example, in some implementations, the plunger 299 can comprise various rubber materials, such as urethane. In general, the plunger 299 is sized and shaped to expand upon compression. The plunger 299 is received in the bore 283 of the seat track fitting body 219, and is positioned adjacent to a lower surface of the seat track 14, as illustrated in FIG. 13. As described in more detail below, the plunger 299 is sized and shaped to expand in the lower and upper chambers 285, 286 of the bore 283 when compressed in the secured configuration.

In operation, the seat track fitting 212 is inserted into the seat track 14 and translated in the seat track 14 in a similar manner as illustrated in FIGS. 6A, 6B. The variation in the secured configuration is illustrated in FIGS. 10 and 13, which illustrate the seat track fitting assembly 210 in the secured configuration. More particularly, when the seat track fitting 212 is in the installed configuration, the hand lever 247 is rotated in a first rotary direction R1. As described above, the hand lever 247 pivotably rotates with respect to the seat track fitting body 219 via first pin 293 extending through first pin apertures 288a, 288b and pin aperture 281 and second pin 294 extending through second pin apertures 289a, 289b and pin slot aperture 280. Such rotary motion of the hand lever 247 moves the rear portion 290 into the first recess 16 of the seat track fitting 14. In particular, the outer surface 291 of the rear portion 290 is surrounded by the first recess 16 of the seat track 14, and the interior surface 292 of the rear portion 290 surrounds the second side surface 233 of the shear flange 230. As the rear portion 290 is received in the first recess 16 of the seat track 14, the securement pin 295 moves into the securement pocket 297, with the biasing member 296 urging the securement pin 295 away from the central flange 221 of the seat track fitting body 219, and into the securement pocket 297. Accordingly, the seat track fitting 212 is secured to the seat track 14.

The anti-rattle feature 287 is also actuated by movement of the hand lever 247 into the first recess 16 of the seat track 14. In particular, as the hand lever 247 is rotated in the first rotary direction R1, the plunger 299 is depressed and moves toward the seat track 14. As the plunger 299 makes contact with a surface of the seat track 14, the plunger 299 is compressed, resulting in compression forces that urge or move the plunger 299 in the bore 283. The movement of the plunger 299 causes upward movement of the seat track fitting body 219 until tensile flanges 231 of shear pads 228 abut or contact undersides of lip portions 13 of the seat track 14.

The lower chamber 285 and the upper chamber 286 of the bore 283 are sized and shaped to account for manufacturing tolerances. In particular, manufacturing tolerances tend to create a gap between lower surfaces of the shear pads 228 and an interior surface of seat track 14 when the seat track fitting 212 is received in the channel 15 of the seat track 14. Under some conditions, this gap can range from between 0 inch to 0.06 inches. Thus, when manufacturing tolerances create a gap that is closer to the upper end, the seat track fitting 212 and the seat track 14 frictionally mate against each other, and when the seat track fitting 212 can no longer move upwards, the compressive forces in the plunger 299 cause the plunger 299 to expand in the lower chamber 285. Conversely, when manufacturing tolerances create a gap that is closer to the lower end, the seat track fitting 212 and the seat track 14 frictionally mate against each other, and when the seat track fitting 212 can no longer move upwards, the compressive forces in the plunger 299 cause the plunger 299 to expand in the upper chamber 286.

To unsecure, uninstall, and disinsert the seat track fitting 212 from the seat track 14 requires the reversal of the steps described above. For example, to unsecure the seat track fitting 212 from the seat track 14, a tool can be inserted through an aperture 255 disposed in the rear portion 290 of the hand lever 247, which depresses the securement pin 295 and moves the securement pin 295 out of the securement pocket 297. Thereafter, the hand lever 247 can be rotated in the second rotary direction R2.

The seat track fitting 212 can be translated until second side surfaces, e.g., second side surfaces 233 of shear flanges 230, abut the first recesses 16 of the seat track 14, thus moving the seat track fitting assembly 210 into the insertion configuration, for example, as illustrated in FIG. 6A. The seat track fitting 212 can thereafter be removed from the seat track 14.

The various embodiments or implementations described above can be combined to provide further embodiments or implementations. Moreover, while the various implementations of the seat track fittings have been described as comprising aluminum, steel, or its various alloys, in some implementations, the seat track fittings can comprise other materials, such as titanium, carbon-fiber reinforced plastics, or other suitable materials.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A seat track fitting assembly including a seat track having a channel sized and shaped to removably, coupleably receive a seat track fitting, the seat track fitting comprising:
a central flange having a lug aperture which is sized and shaped to be coupleable to a payload component;
at least a pair of shear pads, each one of the shear pads protruding outwardly from opposing sides of the central flange and including:
a shear flange having:
a first side surface and a second side surface, the first side surface extending in an arcuate manner and the second side surface extending in an arcuate manner and intersecting with the first surface; and
a recess disposed at a top portion of the shear flange, the recess positioned between the first side surface and the second side surface; and
a tensile flange, wherein the tensile flange and the shear flange are integrally formed with the central flange, as a unitary structure.

2. The seat track fitting assembly of claim 1, further comprising a retainer mechanism operable to secure the seat track fitting to the seat track when the seat track fitting assembly is in an installed configuration.

3. The seat track fitting assembly of claim 1 wherein the first and second side surfaces form an arcuate profile which substantially matches an outer profile of a first recess of the seat track.

4. The seat track fitting assembly of claim 3 wherein the tensile flange extends longitudinally from the first side surface of the shear flange.

5. The seat track fitting assembly of claim 1 wherein the tensile flange has an upper surface that is sized and shaped to abut a lower surface of a lip portion of the seat track when the seat track fitting assembly is in an installed configuration.

6. The seat track fitting assembly of claim 1 wherein the seat track fitting comprises aluminum.

7. A seat track fitting assembly comprising:
a seat track having a plurality of first recesses spaced apart by lip portions;
a seat track fitting moveable between an insertion position and an installed-position, the seat track fitting including:
a central flange; and
at least a pair of shear pads, each one of the shear pads protruding outwardly from opposing sides of the central flange and having:
a shear flange which includes:
a first side surface and a second side surface, the first side surface extending in an arcuate manner and the second side surface extending in an arcuate manner and intersecting with the first surface; and
a recess disposed at a top portion of the shear flange, the recess positioned between the first side surface and the second side surface; and
a tensile flange, wherein the tensile flange and the shear flange are integrally formed with the central flange as a unitary structure.

8. The seat track fitting assembly of claim 7 wherein the first and second side surfaces form an arcuate profile of the tensile flange.

9. The seat track fitting assembly of claim 8 wherein the second side surface abuts an edge of the first recess in the insertion position.

10. The seat track fitting assembly of claim 8 wherein the first side surface abuts an edge of the first recess in the installed position.

11. The seat track fitting assembly of claim 7 wherein the tensile flange is positioned adjacent to the lip portion of the seat track when the seat track fitting is in the installed position.

12. The seat track fitting assembly of claim 7, further comprising:
a retention mechanism actuable between an unsecured configuration and a secured configuration, the retention mechanism in the secured configuration securing the seat track fitting to the seat track.

13. The seat track fitting assembly of claim 7 wherein the tensile flange and the shear flange are integrally formed with each other.

14. The seat track fitting assembly of claim 1, further comprising:
an anti-rattle feature including a plunger that is sized and shaped to be received in a bore disposed in the seat track fitting, the plunger expandable in the bore.

15. The seat track fitting assembly of claim 14 wherein the bore includes an upper chamber and a lower chamber, the plunger expandable either in the upper chamber or in the lower chamber based on a gap between a lower surface of the shear pad and an interior surface of the seat track.

16. A method for securing a seat track fitting having at least a pair of shear pads to a seat track, each shear pad including a shear flange having a first side surface and a second side surface, the first side surface extending in an arcuate manner and the second side surface extending in an arcuate manner and intersecting with the first surface; a recess disposed at a top portion of the shear flange, the recess positioned between the first side surface and the second side surface; and a tensile flange which are integrally formed with each other as a unitary structure, the method comprising:
inserting the seat track fitting in the seat track via a first recess of the seat track, the inserting including positioning first side surfaces of the shear flanges against an edge of the first recess; and
moving the seat track fitting in a first longitudinal direction until second side surfaces of the shear flanges are positioned against the edge of the first recess.

17. The method of claim 16 wherein moving the seat track fitting in the first longitudinal direction causes the tensile flange to be positioned adjacent to a lip portion of the seat track.

18. The method of claim 16, further comprising:
actuating a retention mechanism after the second side surfaces of the shear flanges are positioned against the edge of the first recess, the actuating securing the seat track fitting to the seat track.

19. The method of claim 16, further comprising:
removing the seat track fitting from the seat track, the removing including moving the seat track fitting in a second longitudinal direction which is opposite to the first longitudinal direction until the first side surfaces of the shear flanges are positioned against the edge of the first recess.

20. The method of claim 19, further comprising:
prior to moving the seat track fitting in the second longitudinal direction, actuating a retention mechanism to unsecure the seat track fitting from the seat track.

21. A seat track fitting assembly including a seat track having a channel sized and shaped to removably, coupleably receive a seat track fitting, the seat track fitting comprising:

a central flange having a lug aperture which is sized and shaped to be coupleable to a payload component; and
at least a pair of shear pads, each one of the shear pads protruding outwardly from opposing sides of the central flange and including:
  a shear flange, wherein the shear flange includes:
    a first side surface extending in an arcuate manner and a second side surface extending in an arcuate manner and intersecting with the first surface, the first and second side surfaces forming an arcuate profile which substantially matches an outer profile of a first recess of the seat track; and
    a recess disposed at a top portion of the shear flange, the recess positioned between the first side surface and the second side surface; and
  a tensile flange which extends longitudinally from the first side surface of the shear flange, wherein the tensile flange and the shear flange are integrally formed with the central flange as a unitary structure.

22. A seat track fitting assembly comprising:
a seat track having a plurality of first recesses spaced apart by lip portions;
a seat track fitting moveable between an insertion position and an installed position, the seat track fitting including:
  a central flange; and
  at least a pair of shear pads, each one of the shear pads protruding outwardly from opposing sides of the central flange and having:
    a shear flange which includes:
      a first side surface and a second side surface, the first side surface extending in an arcuate manner and the second side surface extending in an arcuate manner and intersecting with the first surface; and
    a recess disposed at a top portion of the shear flange, the recess positioned between the first side surface and the second side surface; and
    a tensile flange positioned adjacent to the lip portion of the seat track when the seat track fitting is in the installed position, wherein the tensile flange and the shear flange are integrally formed with the central flange as a unitary structure.

23. The seat track fitting assembly of claim 1 wherein the tensile flange and the shear flange are integrally formed with each other.

* * * * *